T. R. COOK.
STORAGE BATTERY.
APPLICATION FILED APR. 7, 1919.
1,411,414. Patented Apr. 4, 1922.
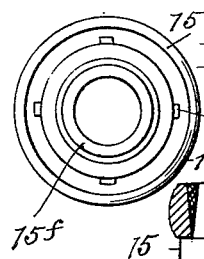
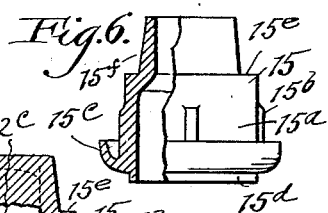
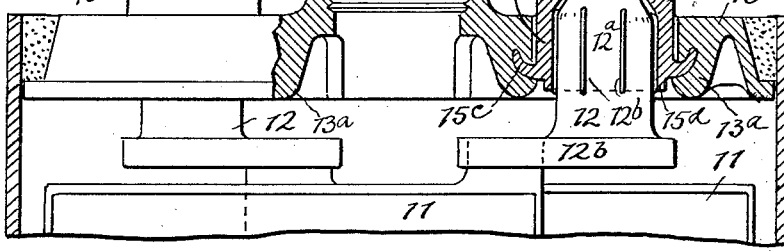
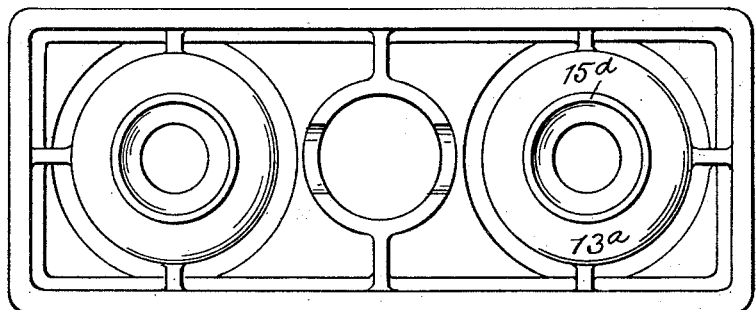
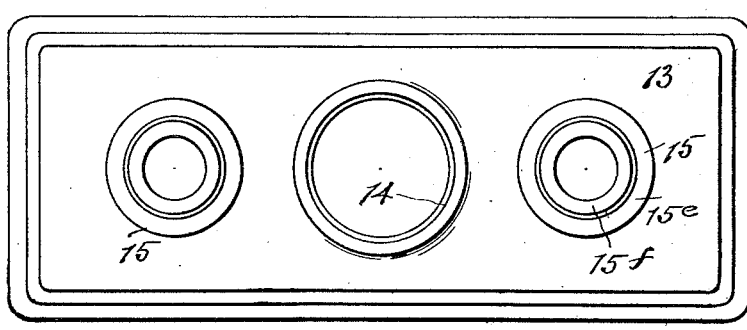
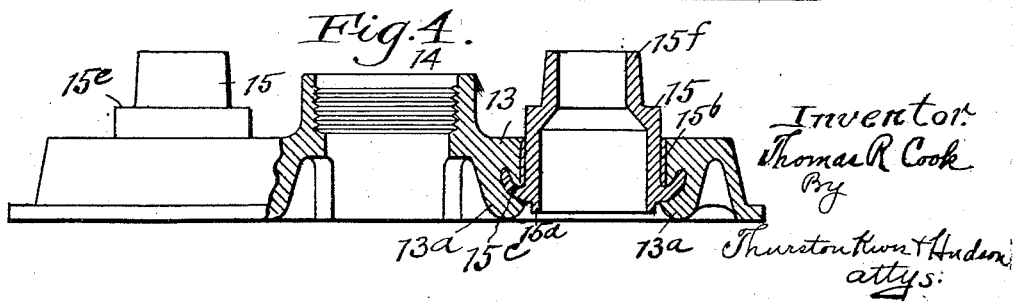
Inventor:
Thomas R Cook
By Thurston Kwon & Hudson
attys.

UNITED STATES PATENT OFFICE.

THOMAS R. COOK, OF EAST CLEVELAND, OHIO, ASSIGNOR TO WILLARD STORAGE BATTERY COMPANY, OF CLEVELAND, OHIO, A CORPORATION OF WEST VIRGINIA.

STORAGE BATTERY.

1,411,414.     Specification of Letters Patent.     Patented Apr. 4, 1922.

Application filed April 7, 1919. Serial No. 288,156.

*To all whom it may concern:*

Be it known that I, THOMAS R. COOK, a citizen of the United States, residing at East Cleveland, in the county of Cuyahoga and State of Ohio, have invented a certain new and useful Improvement in Storage Batteries, of which the following is a full, clear, and exact description.

This invention relates to storage batteries, and particularly to an improved seal between the cover of a cell and the terminal posts extending therethrough, the seal being of the general type shown in patent to T. A. Willard, No. 1,248,768, December 4, 1917.

The principal object of the present invention is to improve the efficiency and utility of a sealing sleeve which is molded in the cover and is designed to be lead-burned to a terminal post when the cover is fitted down onto the cell with the post extending up into the sleeve, and also if desired, to the connector designed to be fitted onto the upper end of the sleeve.

More particularly, it is the aim of the invention to so form the sleeve and the part of the cover in which the sleeve is molded or embedded, that the portion of the sleeve which constitutes the seal is sufficiently removed from the part which is lead-burned to the post, or to the post and connector that the effectiveness of the seal is not adversely affected by the heat generated in the lead-burning operation. Additionally the invention aims to form the sleeve so that it can be readily molded in the cover, and so that the connectors can be quickly placed or located over the sleeves preparatory to lead-burning, irrespective of slight irregularities in the dimensions and spacing of the parts. A still further object is to form the portion of the post below the part which is to be lead-burned to the sleeve, so that the cover and with it the sleeves may be accurately positioned with respect to the top of the jar, irrespective of slight irregularities in the height of the battery elements in the jars of the different cells.

The invention may be briefly summarized as consisting in certain novel details of construction, and combinations and arrangements of parts which will be described in the specification and set forth in the appended claims.

In the accompanying sheet of drawings wherein I have shown the preferred embodiment of my invention, which operates with high efficiency, Fig. 1 is a sectional view through the upper part of a storage battery cell having a cover, and sealing sleeves embodying my invention; Fig. 2 is a view of the under side of the cover removed from the cell; Fig. 3 is a top plan view of the cover; Fig. 4 is a view partly in side elevation and partly in section of the same; Fig. 5 is a top plan view of the sealing sleeve removed from the cover; and Fig. 6 is an elevation of the same partly in section.

In the drawings, 10 represents a battery jar containing the usual positive and negative plates 11, having terminal posts 12 which extend upwardly through the cover 13 of the jar, the latter, as well as the jar itself, being generally formed of hard rubber. The cover has a central flanged opening 14 for a vent plug which is not shown as it does not concern the present invention, and it is provided with two terminal post openings containing sealing sleeves 15, which are molded in the cover and receive the terminal posts. These sealing sleeves are preferably formed of lead.

It will be observed that the cover is provided concentric with respect to the opening receiving each sealing sleeve 15, with a circular flange $13^a$ extending downwardly from the under side of the cover. It will be observed also that the sealing sleeve has a cylindrical portion $15^a$ which extends down into the cover in contact with the inner surface of this circular flange $13^a$, this portion of the sleeve being preferably provided with vertical external ribs $15^b$, clearly shown in Figs. 5 and 6, to assist in anchoring the sleeve. Near its lower end, the cylindrical portion $15^a$ of the sleeve is provided with a laterally and upwardly curved lip or flange $15^c$ which is embedded in the flange $13^a$ of the cover. The depth of the flange $13^a$ of the cover and of the portion $15^a$ of the sleeve is such that the upturned lip $15^c$ on the base of the sleeve is some distance from the top of the cover, and the extreme upper edge of the lip, where the most effective part of the seal is obtained, is by this construction removed a sufficient distance from that part of the sleeve which is lead-burned to the post or to the post and connector, that the effectiveness of the seal is not disturbed in the least by the lead-burning operation or operations. The bottom of the cylindrical part 15ª of the sleeve is provided with a flange or extension 15ᵈ which extends downwardly below the flange or lip 15ᶜ, this part being out of contact with the rubber forming the lower part of the flange 13ª of the cover.

The cylindrical part 15ª of the sleeve extends upwardly above the top of the cover some distance, and then the sleeve is reduced in diameter both internally and externally, the reduction on the exterior being sharp, forming a shoulder 15ᵉ constituting a seat for the connector which is to be fitted onto the end of the sleeve, one of the connectors being shown in section at 16 at the left hand side of Fig. 1. Above the shoulder is the reduced portion 15ᶠ which is preferably tapered slightly interiorly and exteriorly, this portion being adapted to receive the socketed end of the connector, which will be provided with a suitable opening for that purpose.

The terminal post 12 has a body portion 12ª with fine external ribs 12ᵇ and above the portion 12ª it has a reduced tapered portion 12ᶜ, designed to engage the inner surface of the upper part 15ᶠ of the sleeve. The diameter of the body portion 12ª of the post is slightly less than the internal diameter of the portion 15ª of the sleeve but the extended surface formed by the outer edges of the ribs 12ᵇ is slightly greater in diameter than the internal diameter of the portion 15ª of the sleeve. The construction is such that when the cover is fitted down into the jar over the posts, the sleeves engage the fine ribs 12ᵇ and then the cover is forced down crushing the fine ribs until it is at just the right position with respect to the top edge of the jar and when in this position the upper tapered portions of the post and sleeve fit with sufficient closeness for practical purposes, these tapers being such that the cover can be forced down to its proper position though the tapered portions may fit fairly snugly before the final position of the cover is reached. This provides against irregularity of height of the battery elements in the jar.

The upper part of the post and the upper part of the sleeve are then lead-burned together, and the connector may also be lead-burned to the upper part of the sleeve so that in effect the three parts become one continuous unitary structure. It is not essential that the connectors be lead-burned to the sleeves, as they may be clamped around the upper part of the sleeve and held thereto by mechanical means. Generally the cross-connectors are lead-burned to the sleeves of adjoining cells, and the terminal connectors are clamped to the sleeves, but not lead-burned thereto.

It has been previously mentioned that the seal between the sleeve and the cover is not disturbed by the lead-burning operation, this advantage being derived from the form and location of the flange 15ᶜ with reference to the point of lead-burning. The purpose of the lower flange 15ᵈ is to prevent rubber from which the cover is molded, from getting onto and clinging to the inner surface of the sleeve. The shoulder 15ᵉ has a similar function in that it prevents the rubber from coming in contact with the outer surface of the upper part of the sleeve, or that part onto which the connector is fitted. A further advantage of this shoulder is that it forms a positive stop and firm seat for the connector, and does away with the necessity of having a socket on the end of the connector which is to closely receive the upper tapered part of the sleeve. In fact, the sockets on the connectors can be made sufficiently large that the assembling of the connectors on the covers of the different cells, can be accomplished quickly, thus reducing the cost of the assembling operation which is a feature of course highly desirable in quantity production.

Having described my invention, I claim:

1. A cover for a storage battery having an opening for a terminal post and provided with a flange concentric with the opening and extending downwardly on the under side of the cover, and a sealing sleeve molded in the cover concentrically with respect to said opening, and having near its lower end an outwardly extending flange embedded in the flange of the cover.

2. A cover for the cell of a storage battery provided with an opening for a battery post and provided on its under side with a flange concentric with said opening, and a sealing sleeve molded in the cover concentric with respect to the opening, and provided with a laterally and upwardly extending flange embedded in said flange of the cover.

3. A storage battery cover having an opening for a terminal post, and a sealing sleeve designed to be lead-burned to the post and molded to the cover in said opening, said sleeve having near its lower end a laterally extending flange embedded in the cover, and having below said flange a downwardly extending lip or flange.

4. A storage battery cover having an opening for a terminal post, and a sealing sleeve inside said opening with a laterally extending flange embedded in the cover, said sleeve having above the cover a reduced portion forming a shoulder constituting a connector seat, and a portion above the shoulder onto which a connector is adapted to be fitted.

5. In a storage battery, a cell comprising a jar containing battery elements with upwardly extending terminal posts and a jar cover having terminal post openings, and sealing sleeves molded in the cover concentrically with respect to the openings, each post and the associated sleeve having upper portions lead-burned together, and the post having a lower portion with external projections which engage the lower portion of the sleeve when the cover is fitted into the top of the jar.

6. In a storage battery, a cell comprising a jar containing a battery element with an upwardly projecting terminal post and a jar cover having a terminal post opening with a sealing sleeve molded in the cover concentrically with respect to the opening, the upper portions of the post and sleeve being lead-burned together, and the lower portion of one having ribs and the lower portion of the other engaging the ribs when the cover is fitted down into the top of the jar.

In testimony whereof, I hereunto affix my signature.

THOMAS R. COOK.